Figure 1:
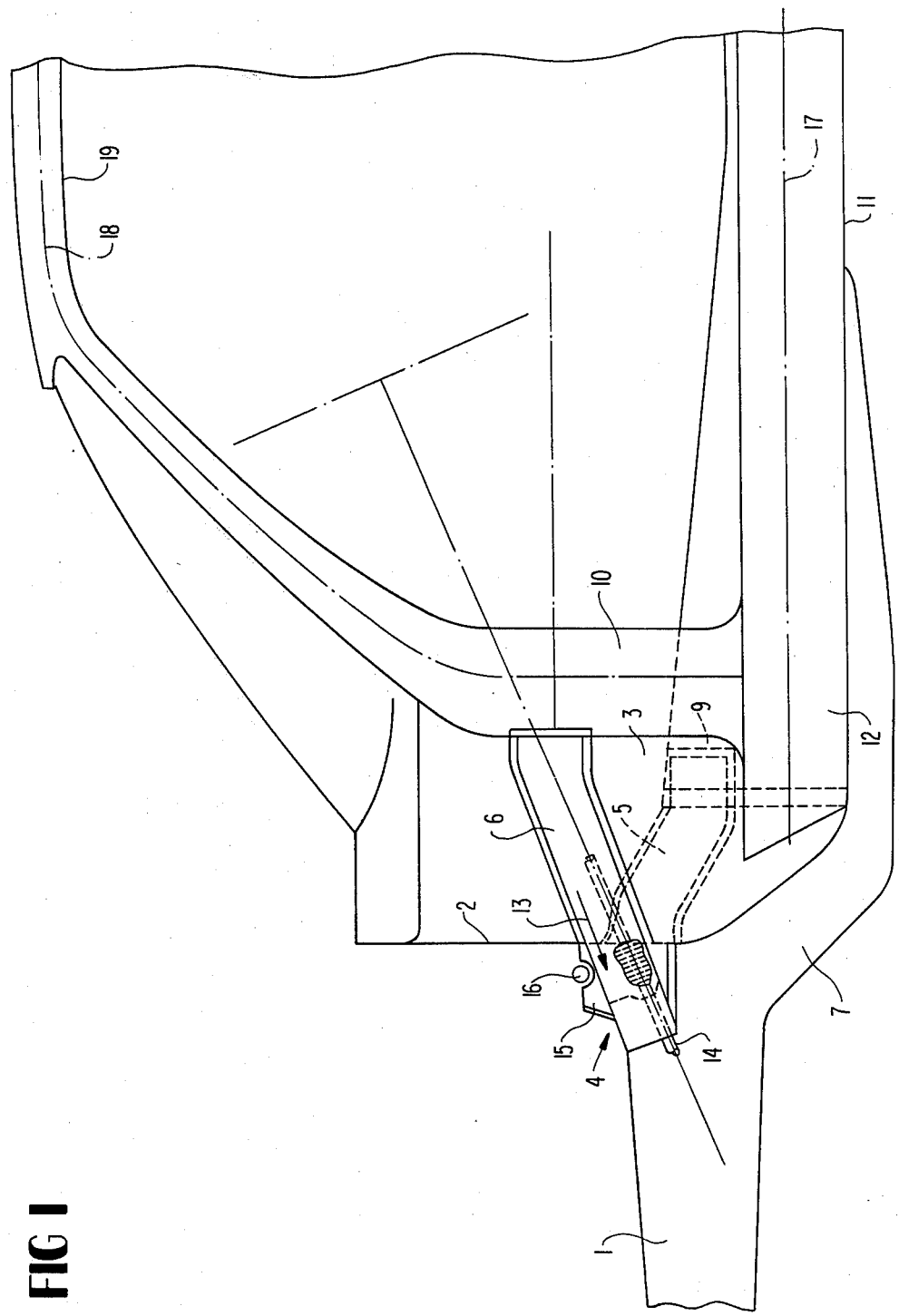

United States Patent [19]

Schwuchow et al.

[11] 4,189,177
[45] Feb. 19, 1980

[54] FORWARD LONGITUDINAL BEARER SUPPORTED AT THE END WALL OF A SELF-SUPPORTING MOTOR VEHICLE BODY

[75] Inventors: Norbert Schwuchow; Helmut Grantz, both of Sindelfingen; Hubert Hutai, Grafenau; Dietrich Rothacker, Sindelfingen; Gerhard Burk, Magstadt; Manfred Mordau, Sindelfingen, all of Fed. Rep. of Germany

[73] Assignee: Daimler-Benz Aktiengesellschaft, Fed. Rep. of Germany

[21] Appl. No.: 911,923

[22] Filed: Jun. 2, 1978

[30] Foreign Application Priority Data

Jun. 3, 1977 [DE] Fed. Rep. of Germany ....... 2725083

[51] Int. Cl.² .............................................. B62D 21/00
[52] U.S. Cl. .................................... 296/188; 280/781
[58] Field of Search ................. 296/28 R, 28 E, 28 F, 296/28 J, 28 K; 280/781, 785; 180/89.1, 90

[56] References Cited

U.S. PATENT DOCUMENTS

| | | | |
|---|---|---|---|
| 2,047,336 | 7/1936 | Stout | 296/28 J |
| 2,797,954 | 7/1957 | Uhlenhaut | 296/28 J |
| 3,827,525 | 8/1974 | Felzer | 296/28 R |
| 3,971,588 | 7/1976 | Bauer | 296/28 R |

*Primary Examiner*—Philip Goodman
*Attorney, Agent, or Firm*—Craig and Antonelli

[57] ABSTRACT

A forward longitudinal bearer supported under angular bending at the end wall of a self-supporting motor vehicle body, whereby the end wall is locally bulged out in the direction toward the respective vehicle end within the connecting area of each forward longitudinal bearer in such a manner that a form-rigid body results; each forward longitudinal bearer is forked in its approach at the form-rigid body and the arms resulting therefrom at least partially surround the form-rigid body.

16 Claims, 2 Drawing Figures

FORWARD LONGITUDINAL BEARER SUPPORTED AT THE END WALL OF A SELF-SUPPORTING MOTOR VEHICLE BODY

The present invention relates to a forward longitudinal bearer supported under angular bending at the end wall or dashboard of a self-supporting motor vehicle body.

The forward structural area of a motor vehicle, especially of a passenger motor vehicle, must be so constructed and designed that, on the one hand, it is able to absorb during normal driving operation the forces stemming, for example, from the wheel suspension without permanent deformation and that, on the other, it remains permanently deformed in an aimed-at intentional manner under energy absorption in case of a front end impact. In that connection, particular importance and significance is attributable to the forward longitudinal bearers and their support at the passenger cell.

A construction of the longitudinal bearers widely used at present with passenger motor vehicles, in which the longitudinal bearers are supported, cranked or offset at the end wall or dashboard and in many cases further extended to the subfloor, entails the disadvantage that a height offset occurs as a result of the angular bent or cranked configuration. As a result thereof, a moment occurs in case of a front end impact which may effect a bending or breaking off of the longitudinal bearer and a penetration thereof into the foot space of the vehicle.

It has already been proposed in experimental safety vehicles to counteract this disadvantage in that a support or brace is extended from the offset or angularly bent area of the longitudinal bearer to the forward column of the passenger cell. However, in order that this column, in its turn, is able to withstand this additional load, it has to be designed and constructed correspondingly, which means a large weight increase.

Accordingly, it is the aim of the present invention to support the forward longitudinal bearers in connection with supporting parts of the passenger cell without special weight-increasing measures and by simple measures in such a manner that under all occurring load conditions the resulting forces can be safely introduced without deformation appearances at non-desired places.

Consequently, a forward longitudinal bearer supported under angular bending at the end wall of a self-supporting motor vehicle body is proposed, whereby according to the present invention the end wall or dashboard is locally bulged out in the direction toward the respective vehicle end within the adjoining area of each forward longitudinal bearer in such a manner that a form-rigid body results, and whereby each forward longitudinal bearer receives a forking at its inclined approach at the form-rigid body and the arms resulting thereby at least partially surround the form-rigid body.

A particularly high rigidity is achieved if the form-rigid body has approximately the shape of a truncated pyramid.

In a preferred embodiment of the present invention, the forking is achieved by a fork bearer mounted on each longitudinal bearer, whose one arm is connected within the area of the center longitudinal axis of the motor vehicle at the subfloor respectively at the inner tunnel wall and whose other arm is supported end-face at the forward wall column, and whereby the forward longitudinal bearer is extended as further arm up to the threshold bearer without interruption of the force flow and connected with the subfloor.

It is furthermore possible to provide the fork bearer with an aperture disposed in the neutral cross-sectional zone for extending therethrough the steering column. A change in rigidity of the fork bearer which is of any significance does not occur thereby.

A preassembled structural part fulfilling several functions is also created in that at least one bearing support for a torsion rod is formed out of the upper area of the fork bearer.

According to a further feature of the present invention, the arm extending to the forward wall column may extend at an angle rising to the horizontal and may adjoin at a point of the forward wall column, which with forwardly hinged door lies between the hinges arranged one above the other and whose distance to the center longitudinal axis of the threshold bearer is to the distance to the center longitudinal axis of the outer roof longitudinal girder as approximately the ratio of 0.4:1. Thus, all three arms adjoin areas far-reachingly extending in the impact direction.

Accordingly, it is an object of the present invention to provide a forward longitudinal bearer supported under angular bending at the end wall or dashboard of a self-supporting motor vehicle body which avoids by simple means the aforementioned shortcomings and drawbacks encountered in the prior art.

Another object of the present invention resides in a forward longitudinal bearer supported with angular bending at the dash of a self-supporting motor vehicle body which greatly improves the vehicle safety without weight increase of parts thereof.

A further object of the present invention resides in a forward longitudinal bearer of the type described above which precludes the occurrence of a moment in case of a front end impact that may cause a buckling and/or penetration of the longitudinal bearer into the leg space of the vehicle.

Still another object of the present invention resides in a front end structure for motor vehicles in which the longitudinal bearers are able to achieve a safe energy-absorbing buckling, yet other parts of the vehicle need not be strengthened and therefore need not be increased in weight.

Another object of the present invention resides in a forward longitudinal bearer of the type described above which is so constructed and arranged that under all occurring load conditions the resulting forces can be introduced safely without deformation occurrences at undesired places.

A further object of the present invention resides in a forward longitudinal bearer supported under angular bending at the dash of a self-supporting motor vehicle body which is characterized by a particularly high rigidity utilizing extremely simple means.

Figure 2:
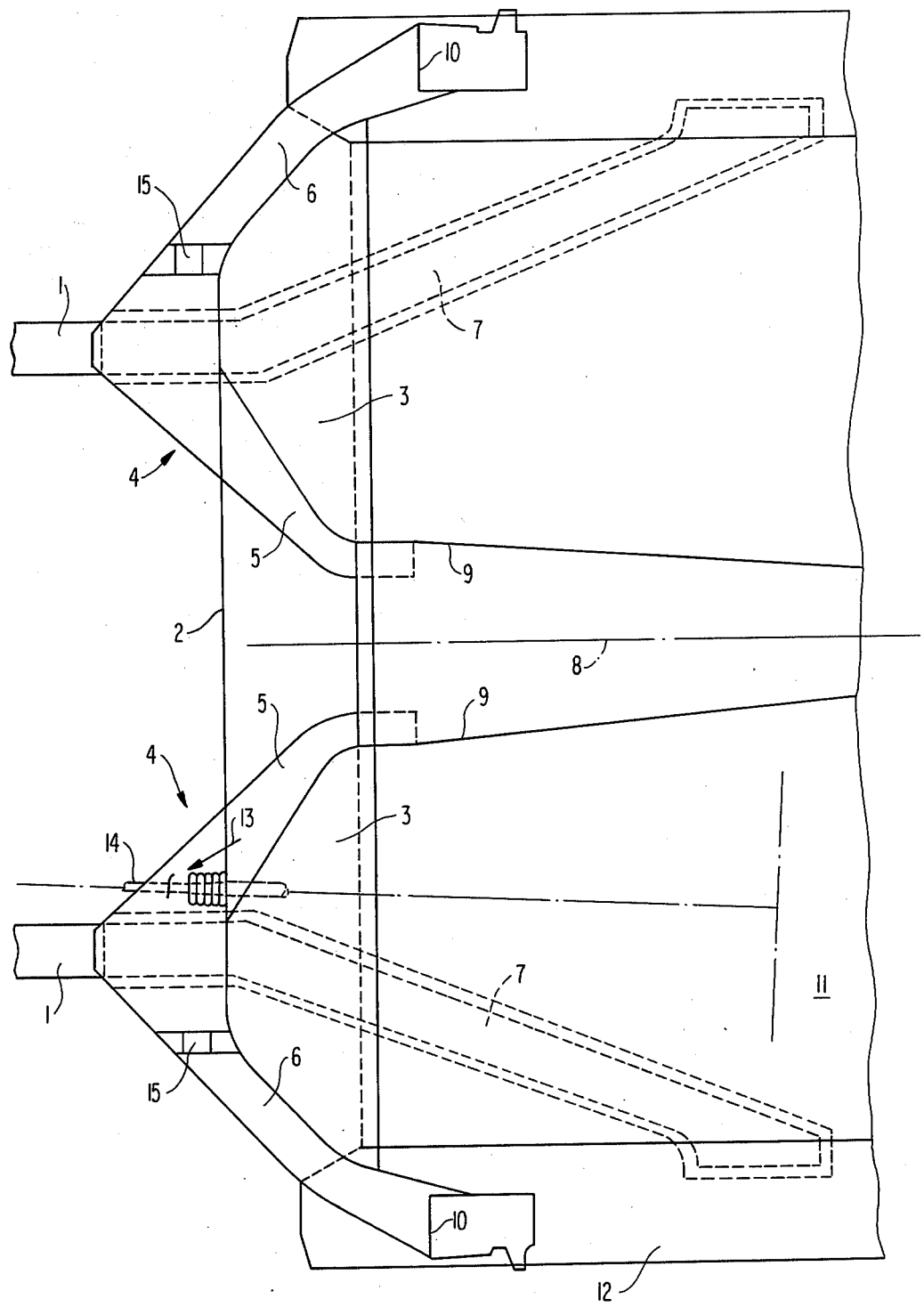

These and other objects, features and advantages of the present invention will become more apparent from the following description when taken in connection with the accompanying drawing which shows, for purposes of illustration only, one embodiment in accordance with the present invention, and wherein:

FIG. 1 is a partial side elevational view of a forward longitudinal bearer supported in accordance with the present invention; and FIG. 2 is a somewhat schematic plan view on the arrangement according to FIG. 1.

Referring now to the drawing wherein like reference numerals are used throughout the two views to designate like parts, both forward longitudinal bearers 1 of a self-supporting passenger motor vehicle body, not illustrated in detail, are supported under angular bending at an end wall or dashboard 2. The end wall 2 is bulged out locally in the shape of a truncated pyramid—as is shown in particular in FIG. 2—whence a form-rigid body 3 of high bearing capacity results in each case. In front of the approach and abutment of each forward longitudinal bearer 1 at the form-rigid body 3, the longitudinal bearer receives a forking by means of a fork bearer generally designated by reference numeral 4 which is mounted on the respective forward longitudinal bearer, whereby altogether three arms 5, 6, and 7 result, which at least partially surround the form-rigid body 3 and proportionally introduce the occurring forces.

The arm 5 thereby terminates within the area of the center longitudinal axis 8 (FIG. 2) of the motor vehicle at the inner tunnel wall 9, whereas the arm 6 is supported at the forward wall column 10. The still-remaining arm 7 is created by the continuation of the forward longitudinal bearer 1 which extends up to the threshold bearer 12 without interruption of the force flow and connected to the subfloor 11.

The fork bearer 4 which is adapted to be mounted as preassembled structural part is provided in its neutral zone with an aperture 13 for extending therethrough a steering column 14 and is additionally provided with, for example, formed-on bearing supports 15 for a torsion rod 16 (FIG. 1).

As can be seen in particular from FIG. 1, for purposes of better force distribution, the extension of the arm 6 takes place at an angle inclined upwardly rearwardly with respect to the horizontal which may amount to about 20°, and the connection of this arm 6 takes place at a point of the forward wall column 10 whose distance to the center longitudinal axis 17 of the threshold bearer 12 to the distance to the center longitudinal axis 18 of the outer roof longitudinal girder 9 is at the ratio of about 0.4:1. It should be observed thereby that the point of connection at the forward wall column 10 is located with the present-day customary, forwardly hinged doors, between the hinges (not shown) arranged one above the other in order that in case of a particularly vehement impact the door opening force to the greatest possible extent does not increase.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle body including a longitudinal bearer and comprising end wall means defining a wall of a passenger compartment and locally bulged out in the direction of the respective vehicle end in a manner forming a rigid body, said longitudinal bearer having an end supported against said end wall and being forked so as to create a plurality of arms partially surrounding said rigid body.

2. A vehicle body according to claim 1, characterized in that the rigid body has approximately the shape of a truncated pyramid.

3. A vehicle body according to claim 1 or 2, wherein one said longitudinal bearer and rigid end wall body are provided on each side of the center longitudinal axis of the vehicle body, one arm of said forked bearer means being connected within the area of the center longitudinal axis of the motor vehicle at a fixed vehicle part, another arm being supported at an end-face on a forward wall column means, and a further arm of the longitudinal bearer being extended up to a threshold bearer without interruption of the force flow and connected with a fixed vehicle part.

4. A vehicle body according to claim 3, characterized in that both of said relatively fixed vehicle parts are parts of the subfloor.

5. A vehicle body according to claim 3, characterized in that said first-mentioned relatively fixed vehicle part is the inner tunnel wall and said second mentioned fixed vehicle part is the subfloor.

6. A vehicle body according to claim 3, characterized in that the forked longitudinal bearer is provided with an aperture disposed in the neutral cross-sectional zone for extending a steering column therethrough.

7. A vehicle body according to claim 3, characterized in that at least one bearing support for a torsion rod is formed out of the upper area of the forked longitudinal bearer means.

8. A vehicle body according to claim 7, characterized in that the arm extended to the forward wall column means extends at an angle rising with respect to the horizontal.

9. A vehicle body according to claim 8, characterized in that the arm extended to the forward wall column means is connected at a point of the forward wall column means which, with a forwardly hinged door, is located between hinges arranged one above the other.

10. A vehicle body according to claim 9, characterized in that the ratio of the distance from said point of connection to the longitudinal center axis of the threshold bearer means to the distance from said point to the center longitudinal axis of an outer longitudinal girder is approximately 0.4:1.

11. A vehicle body according to claim 3, characterized in that the arm extended to the forward wall column means extends at an angle rising with respect to the horizontal.

12. A vehicle body according to claim 3, characterized in that the arm extended to the forward wall column means is connected at a point of the forward wall column means which, with a forwardly hinged door, is located between hinges arranged one above the other.

13. A vehicle body according to claim 12, characterized in that the ratio of the distance from said point of connection to the longitudinal center axis of the threshold bearer means to the distance from said point to the center longitudinal axis of an outer longitudinal girder is approximately 0.4:1.

14. A vehicle body according to claim 6, characterized in that at least one bearing support for a torsion rod is formed out of the upper area of the forked longitudinal bearer means.

15. A vehicle body according to claim 14, characterized in that the arm extended to the forward wall column means extends at an angle rising with respect to the horizontal.

16. A vehicle body according to claim 15, characterized in that the arm extended to the forward wall column means is connected at a point of the forward wall column means which, with a forwardly hinged door, is located between hinges arranged one above the other.

* * * * *